United States Patent [19]

Pfeifer et al.

[11] 4,349,730
[45] Sep. 14, 1982

[54] DATA PROCESSING DEVICE FOR READING AND PROCESSING VISUALLY OBSERVABLE INFORMATION PRESENT ON A DATA CARRIER

[75] Inventors: Josef Pfeifer, Unterhaching; Rudolf Paulus, Munich; Eberhard Zieran, Grünwald, all of Fed. Rep. of Germany

[73] Assignee: Agfa-Gevaert Aktiengesellschaft, Leverkusen, Fed. Rep. of Germany

[21] Appl. No.: 131,359

[22] Filed: Mar. 18, 1980

[30] Foreign Application Priority Data

Mar. 20, 1979 [DE] Fed. Rep. of Germany ....... 2910854

[51] Int. Cl.³ ............................................... G06K 9/04
[52] U.S. Cl. .................................... 235/472; 235/470
[58] Field of Search .............................. 235/470, 472; 340/146.35 Y; 360/117

[56] References Cited

U.S. PATENT DOCUMENTS

| 3,731,062 | 5/1973 | Reilly | 235/470 |
| 3,918,028 | 11/1975 | Humphrey | 235/472 |
| 3,946,205 | 3/1976 | Melugin | 235/470 |
| 3,947,817 | 3/1976 | Requa | 235/472 |

Primary Examiner—Harold I. Pitts
Attorney, Agent, or Firm—Michael J. Striker

[57] ABSTRACT

The data processing device for reading and processing visually observable information taking place on a data carrier includes a hand operated reading unit guidable in a first direction along a line of the text on the data carrier; scanning unit in the form of a column of photoelectric elements is arranged in the reading unit in a direction perpendicular to the direction of movement of the reading unit; and timing means provided in the reading unit for controlling the scanning rate of respective elements in response to the speed of movement of the reading unit.

4 Claims, 8 Drawing Figures

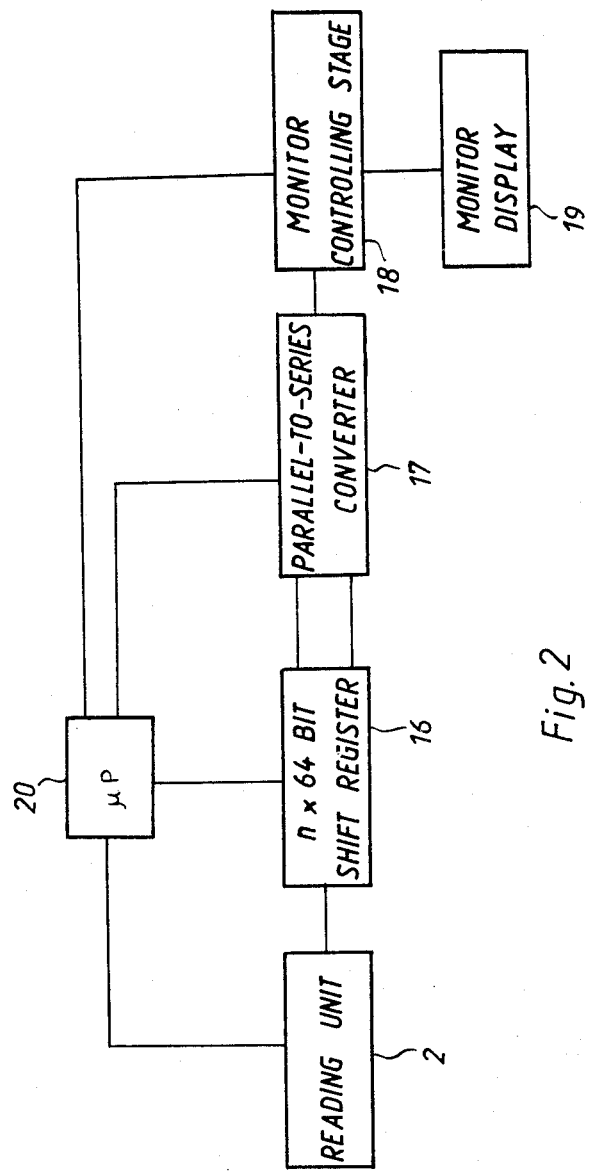

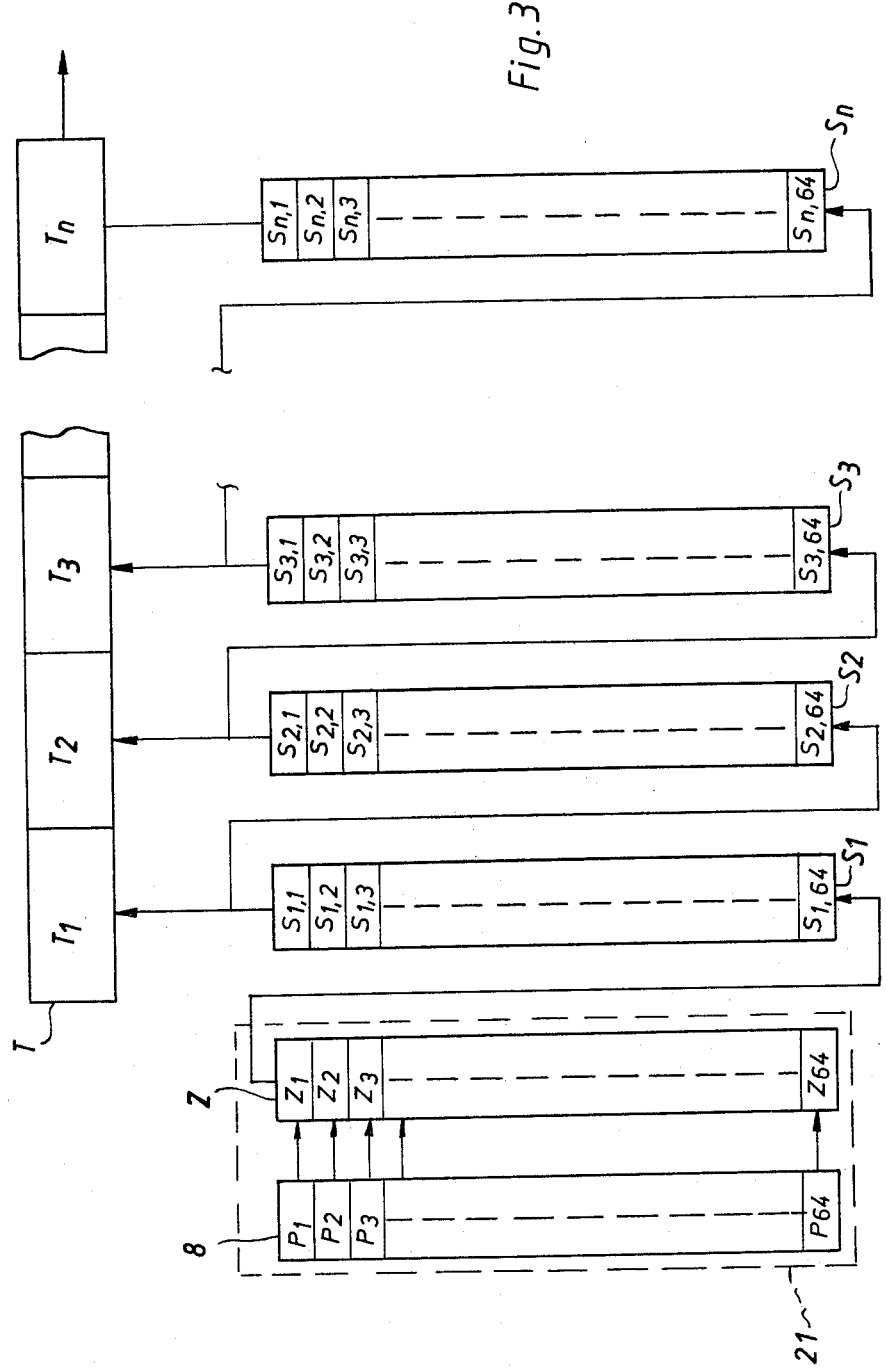

DATA PROCESSING DEVICE FOR READING AND PROCESSING VISUALLY OBSERVABLE INFORMATION PRESENT ON A DATA CARRIER

BACKGROUND OF THE INVENTION

The present invention relates in general to data processing devices and in particular to a device for reading and processing visually observable information present on a data carrier.

A hand operated document reader is known which is manually guided over the lines to be scanned from in the document whereby the hand operated reading device is capable of detecting certain standard type characters (OCR-A or OCR-B) by means of an electronic type character detecting unit which supplies corresponding signals to a data processing station where the signals are evaluated and processed in any suitable known manner. Such conventional hand operated reading device, however, is limited to the detection of one or more standard sets of characters or letters.

SUMMARY OF THE INVENTION

A general object of the present invention is to provide an improved data processing device of the afore-described type which is capable of reading and processing any visually observable information.

An additional object of the invention is to provide such an improved data processing device in which the subsequent processing of data fed from the reading device is independent from the speed at which the user of the hand operated reading device guides the same over the information carrier.

In keeping with these objects, and others which will become apparent hereafter, one feature of the invention resides, in a data processing device for reading and subsequently processing data taking place on a data carrier, in the provision of a hand operated reading unit guidable in a first direction along the data on the carrier, scanning means provided in the reading unit for scanning point by point the data on the carrier in a second direction which is perpendicular to the first direction such as for example the scanning of successive columns within one line, and timing means for synchronizing the rate of scanning in the second direction in response to the relative speed between the hand operated reading unit and the data carrier.

In this manner, the detected succession of vertical signals in the form of charges, voltages, currents and the like corresponding to the detected brightness values of respective points of the scanned region, upon suitable preliminary and subsequent processing can be fed to a reproduction unit in which a readable information is displayed again on a display unit or on a copy.

In the preferred embodiment of this invention, the scanning means for scanning the columns of data in the second direction is preferably in the form of a matrix or an array of photodiodes facing the data carrier. The length of the matrix of the photodiodes is defined by the maximum width of the region to be scanned.

The timing means for synchronizing the scanning cycle in the second direction for the columns of the recorded information includes preferably a distance detector for measuring the displacement of the hand operated reading unit relative to the data carrier. Preferably, the distance detector includes a friction wheel or roller mounted for rotation in the reading unit in such a manner that the reading unit is movably supported by the frictional roller on the data carrier for movement in the aforementioned one direction. The rotation of the frictional roller is detected in a suitable manner, for example by optoelectronic means and the detected output signal is applied for timing the start signals for scanning in the second direction along the columns of the read information.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 2 is a block diagram of the device of FIG. 1;

FIG. 3 is a block diagram of a sliding recorder in the device of FIG. 1;

DESCRIPTION OF THE PREFERRED EMBODIMENTS

Figure 1:
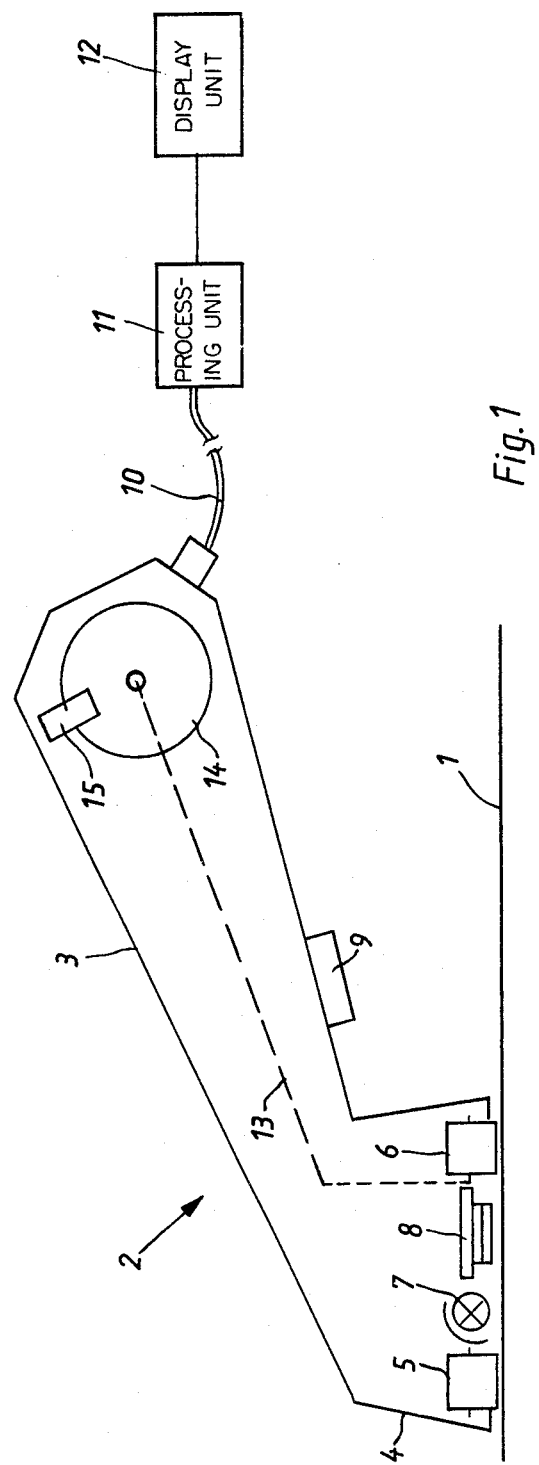
FIG. 1 is a simplified side view of the data processing device of this invention.

Referring now to FIG. 1, the reference numeral 1 designates a data carrier such as, for example, a typewritten sheet. A hand operated reading unit 2 includes a handle 3 provided with a starting pushbutton 9 and being connected to a reading head 4. The lower side of the reading head 4 faces the data carrier 1 and supports for rotation rollers 5 and 6 by means of which the reading unit 2 is supported on the data carrier 1 for movement in one direction, for example, in the direction of one or more lines in the scanned text. Head 4 further includes an illumination unit 7 for illuminating always the region of the information carrier 1 which is being scanned and a matrix or an array of photodiodes 8 is arranged above the illuminated region.

In operation, the hand operated reading unit 2 is manually guided in the one direction (perpendicular to the plane of the drawings) at an arbitrary speed over the data on the data carrier 1. By pressing the pushbutton 9 the apparatus is brought to a ready-to-read condition. By moving the unit 2 in the one direction, the present data on the carrier 1 are detected point by point on the array of photodiodes 8 which in turn generate a succession of electrical signals corresponding to the detected brightness differences. The succession of the output signals from the matrix 8 is transmitted via an extensible cable 10 to a data storing and processing unit 11 where the signals are processed in a suitable conventional manner and, if desired, applied to a display unit 12 where they are again converted on a monitor or on a conventional cathode ray tube terminal into a readable image corresponding to the detected information. If desired, the signals stored in the unit 11 can be applied in a known manner to a printer or copier where the detected information is converted in a printed copy.

As it has been mentioned before, the line of information scanned in the one direction is also scanned in the matrix 8 in a second, perpendicular direction corresponding to columns of points in the scanned line. The scanning rate in the second perpendicular direction is determined by the requirement for a uniform spacing between two adjoining scanned columns. The magnitude of the spacing results from the desired dissolution power of the whole apparatus. Since the reading unit 2 is guided and operated by hand and consequently is displaced at a variable speed, there is provided a timing control of the activation of the array of diodes 8 which ensures an equidistant scanning of respective characters and columns. For this purpose the roller 6 is coupled via a connecting shaft 17 to a measuring disc 14 which is supported for rotation in the handle 3 and cooperates with an electooptic or other suitable pickup 15 which measures the instant speed of movement of the reading device 2 relative to the data carrier 1. The output signal from the pickup unit 15 is proportional to the measured instant speed and, as it will be explained below, is fed to those photodiodes in the array 8 which are employed for scanning in the second direction the respective gaps or points so as to maintain the uniform spacings therebetween.

In the block diagram in FIG. 2, there is illustrated how the succession of electrical signals generated by the photodiode array in the reading unit 2 is fed in series to an $n \times 64$ bit shift register 16 whereby n corresponds to the maximum length of a scanned line which can be stored in the register. The photodiode ray 8 includes for example 64 photodiodes so that for storing a continuous line of n data there is required $n \times 64$ storing places in the shift register 16. From the shift register 16 the succession of signals is fed to a parallel-to-series converter 17 from which the signals are applied via a monitor controlling stage 18 into a monitor display. Alternatively, the scanned information or data can be displayed on a cathode ray tube of a conventional television apparatus or are reproduced in a conventional matrix copying machine to provide a corresponding copy of the original document. For controlling the individual processing steps of the scanned signals there is provided a microprocessor 20 coupled to all stages 2, 16, 17 and 18.

Referring now to FIG. 3, the output signals from respective photodiodes $P_1$ to $P_{64}$ of the photodiode array 8 are fed to the assigned storing points $Z_1$ to $Z_{64}$ of an intermediate register Z. The circuit including both the photodiode array 8 and the intermediate register Z can be in the form of the known CCD (charge coupled device) 21. At each scanning cycle, the contents of the storing points $Z_1$ to $Z_{64}$ are fed in series into the shift register $S_1$ and in doing so the data scanned in the course of a continuous scanning operation is shifted to shift registers of higher order or higher index marks. The train or succession of signals applied in series into shift registers $S_1$ to $S_n$ are, upon completion of a continuous scanning operation, fed parallel to respective stages of the tranfer shift register T whereby a storing line $T_1$ to $T_n$ of the shift register T corresponds to a straight line scanned in one direction by one of the photodiodes $P_1$ to $P_{64}$ in the course of a continuous scanning strike. In order to display or reproduce the stored information the rows of storing points in register T are applied row by row to a display or copying device.

Figure 4A:
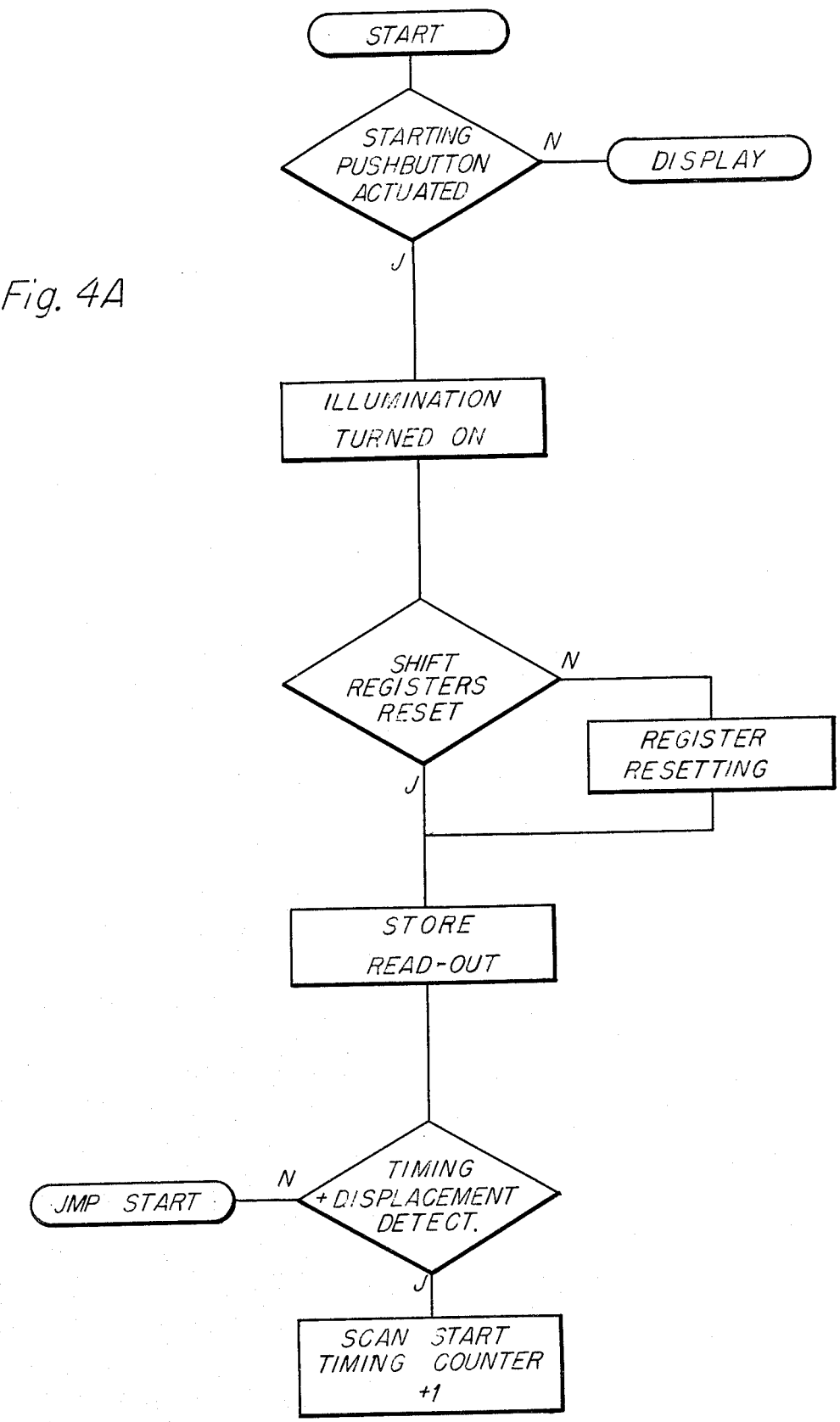
FIGS. 4a through 4c are flow diagrams of the operation of the data processing device of this invention.
Figure 4B:
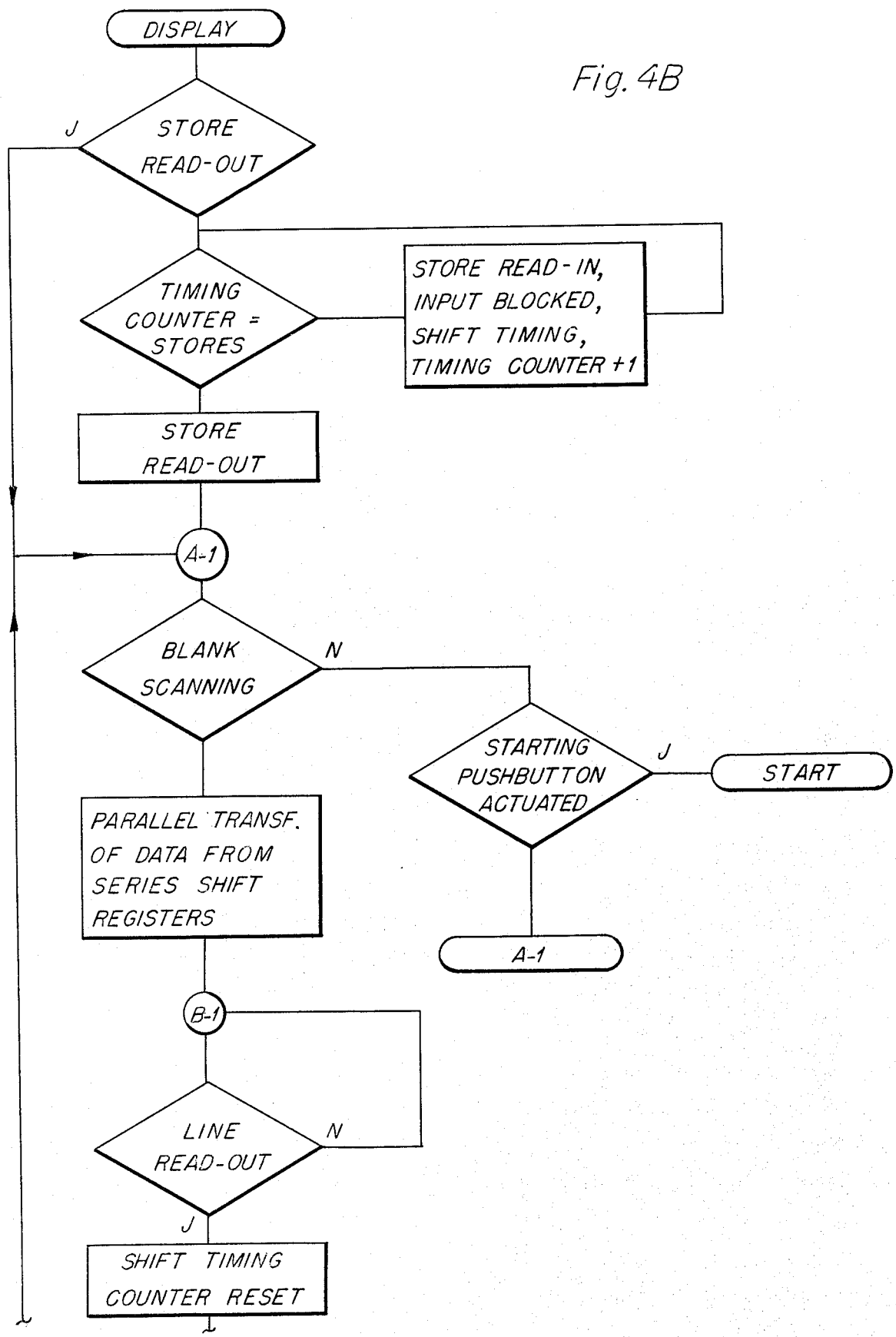
Figure 4C:
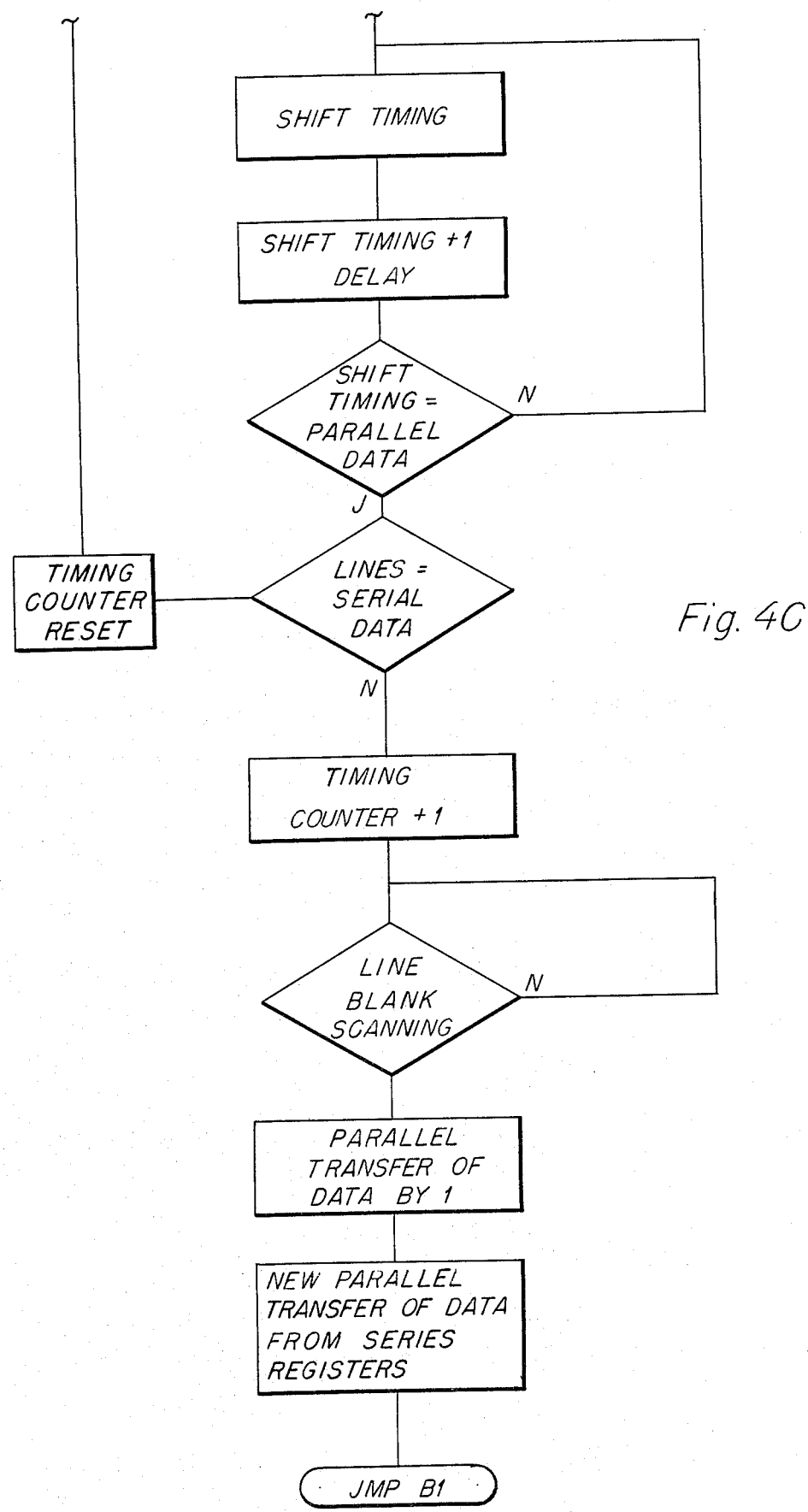

The float diagrams from FIGS. 4a through 4c explain the function and operation of the device of this invention. When the data processing device of this invention is energized without switching on the pushbutton 9, the contents stored in the $n \times 64$ bit shift registers $S_1$ to $S_n$ in the block 16 is indicated on the monitor 19. As soon as the reading control button 9 is pressed, the $n \times 64$ bit shift registers are reset or erased and the illumination lamp 7 is switched on. Now, the reading unit 2 is moved in one direction over the data carrier 1 and the array 8 starts scanning by consecutively supplying bit signals into the CCD shift register Z and therefrom into respective shift registers $S_1$ to $S_n$. In order to reproduce the information stored in the latter $n \times 64$ bit shift registers, the reading in mode of operation is switched over to a selecting or reading out mode of operation in the indicator shift register T as illustrated in FIG. 4b. Accordingly, the contents of a continuous line, for example, the contents of the first row of data in shift registers $S_1$ to $S_3$ storing points $S_{1.1}, S_{2.1}, S_{3.1}$ to $S_{n.1}$ is fed parallel into the shift register T. Therefrom, the stored information is fed bit by bit in synchronism with the shifting cycle for indication on the monitor. During each dark return sweep of the electron beam of the cathode ray tube of the monitor the next data from shift registers $S_1$ to $S_n$ are transferred into the indicator shift register T.

Figure 5:
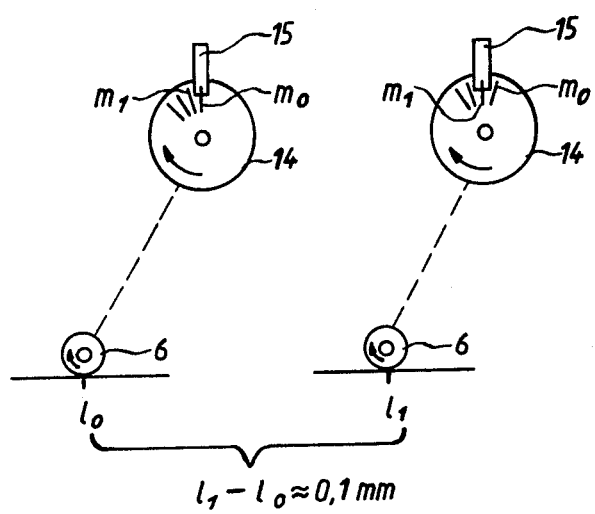
FIG. 5 shows schematically the displacement of a measuring disk between two points of a data carrier.

As depicted in FIG. 5, the measuring disk 14 is provided on its periphery with uniformly spaced marks $m_0$, $m_1$, and so on, which are sensed by the pick-up unit 15. These marks m can be either in the form of optically detectable lines, and the pick-up unit in this case is an optical scanning device; it is also possible to use other types of marks, such as for example magnetic segments detectable by a corresponding pick-up.

Figure 6:
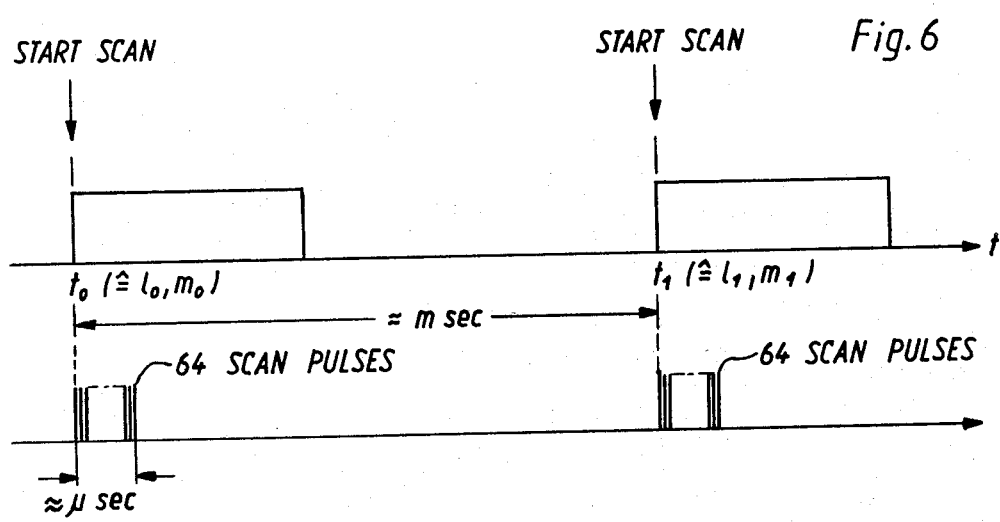
FIG. 6 is a time diagram of scan pulses generated as a function of scanning speed.

Measuring disk 14 is driven by the roller 6 so that a certain angular displacement of the roller 6 corresponds to the angular displacement of the measuring disk 14. The spacing of respective marks $m_0$, $m_1$, and so on, on the disk 14 is selected such as to correspond the least distance between two points $1_0$ to $1_1$ in the direction of scanning in which the device is still responsive. For instance, if it is desired to scan ten points per millimeter, the minimum marked distance $1_1 - 1_0 = 0.1$ mm. Accordingly, on rolling roller 6 over this minimum distance, the measuring disk 14 is angularly displaced from the mark $m_0$ to the mark $m_1$ and the scanning or pick-up unit 15 detects two starting signals between the time points $t_0$ and $t_1$, as seen from FIG. 6. In this manner, each point detected in the direction of reading (the first direction) generates a pulse in the pick-up 15 which serves for starting the scanning along the second direction. At each starting impulse, a series of 64 scan pulses is released, which control the scanning of data on the carrier in the second direction. While the rate of starting impulses is a function of reading speed, that is of the velocity at which the reading unit moves over the data carrier, and corresponds to the scanning rate in the order of kilocycles (corresponding to a scanning speed of 0.1 meter/second as the resolution or mark recognition is 0.1 mm), the impulse rate of the scan pulses is in the range of megacycles.

It will be understood that each of the elements described above, or two or more together, may also find a useful application in other types of constructions differing from the types described above.

While the invention has been illustrated and described as embodied in a specific example of the data processing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A data processing device for picking up and processing visually observable data present on a data carrier, comprising a hand operated reading unit guidable in a first direction over the data on said carrier; scanning means provided in said reading unit for scanning point-by-point the data on said carrier in a second direction which is perpendicular to said first direction; timing means arranged for controlling the time of successive scanning operation in said second direction in dependence on the speed of said reading unit relative to said data carrier in said first direction; said scanning means including a matrix of photoelectric elements extending in said second direction and cooperating with said timing means; said timing means including a displacement detector for measuring the displacement of said reading means relative to said data carrier; and said displacement detector includes a sectional roller supported for rotation in said reading unit and being engageable with said data carrier and means for generating a control signal proportional to the instant speed of said sectional roller.

2. A data processing device as defined in claim 1, further including a reproduction unit coupled to said array of photodiodes by a flexible cable.

3. A data processing device as defined in claim 2, wherein said reproduction unit includes a monitor provided with a cathode ray tube display unit and/or a copying apparatus.

4. A data processing device as defined in claim 3, further including data storing means coupled between said reading unit and said reproduction device for successively storing the scanned information and for feeding the stored information at a fixed rate to said reproduction unit.

* * * * *